(12) United States Patent
Bertrand

(10) Patent No.: US 6,213,915 B1
(45) Date of Patent: Apr. 10, 2001

(54) APPARATUS AND METHOD OF MODIFYING AN OVERDRIVE AUTOMATIC TRANSMISSION

(75) Inventor: Len Bertrand, Richmond (CA)

(73) Assignee: Lentec Automatics Inc., Richmond (CA)

( * ) Notice: Subject to any disclaimer, the term of this patent is extended or adjusted under 35 U.S.C. 154(b) by 0 days.

(21) Appl. No.: 09/239,019

(22) Filed: Jan. 29, 1999

(51) Int. Cl.[7] ............................................. F16H 3/62
(52) U.S. Cl. ................................... 477/127; 477/130
(58) Field of Search ..................................... 477/127, 130, 477/142, 156; 74/606 R; 475/120

(56) References Cited

U.S. PATENT DOCUMENTS

| 5,142,940 | | 9/1992 | Hasegawa | 74/606 R |
|---|---|---|---|---|
| 5,360,487 | | 11/1994 | Sepe | 134/22.1 |
| 5,536,221 | * | 7/1996 | Lee | 74/606 R X |
| 5,540,628 | * | 7/1996 | Younger | 475/120 |
| 5,624,342 | * | 4/1997 | Younger | 475/127 |
| 5,730,685 | * | 3/1998 | Younger | 477/130 X |
| 5,743,823 | * | 4/1998 | Younger | 475/120 |
| 5,768,953 | * | 6/1998 | Younger | 74/606 R |
| 5,820,507 | * | 10/1998 | Younger | 475/120 |

* cited by examiner

*Primary Examiner*—Khoi Q. Ta
(74) *Attorney, Agent, or Firm*—Paul S. Sharpe; Marks & Clerk

(57) ABSTRACT

A valve body for use in an automatic overdrive transmission where the hydraulic fluid passages are blocked in selected locations in the body. The blockages result in increased pressure in the free passages and redirection of fluid flow such that the reverse clutch assembly is operable in third gear. By this procedure, the torque capacity of the transmission is increased.

18 Claims, 5 Drawing Sheets

APPARATUS AND METHOD OF MODIFYING AN OVERDRIVE AUTOMATIC TRANSMISSION

COPYRIGHT NOTICE

A portion of the disclosure of this patent document contains material which is subject to copyright protection. The copyright owner has no objection to the fascimile reproduction of the patent document or the patent disclosure, as it appears in the Patent and Trademark Office patent file or records, but otherwise reserves all copyright rights whatsoever.

FIELD OF THE INVENTION

The present invention relates to a modified valve body and more particularly, the present invention relates to a valve body and automatic transmission incorporating the valve body as well as a method of operating the valve body for enhanced torque capacity from an automatic transmission.

BACKGROUND OF THE INVENTION

In a conventional automatic overdrive transmission, two distinct input shafts are provided consisting of an outer and an inner input shaft. Accordingly, power train energy can be manipulated to enhance torque output. Typically, in the conventional transmission the outer input shaft is driven by the turbine of the torque converter, while the inner input shaft receives drive energy from the front cover of the torque converter. The cover rotates continuously during the operation of the engine.

The outer input shaft is responsible for operation of first gear, second gear, reverse gear and partly for third gear (60%). In contrast, the inner input shaft partly operates third gear and fourth gear entirely.

A system whereby such a transmission could be employed for enhanced torque capacity given the input shaft relationship has not been previously recognized in the art.

SUMMARY OF THE INVENTION

One object of the present invention is to provide an improved transmission and method of operation for increasing the torque capacity of a standard automatic overdrive transmission.

A further object of the present invention is to provide a method of increasing torque capacity in an automatic overdrive transmission, the transmission having a third gear and fourth gear clutch assembly, a reverse/forward clutch assembly and a torque converter with a turbine, the method comprising:

providing a valve body having a plurality of hydraulic valves for controlling up shift and downshift of transmission gears, the body having a network of fluid passages therein;

providing an automatic overdrive transmission having an inner input shaft and an outer input shaft coaxially arranged with the outer input shaft, the inner input shaft for partially operation of third gear and entire operation of fourth gear;

coupling the inner input shaft and the outer input shaft to the turbine of the torque converter; and selectively blocking the fluid passages for redirecting hydraulic fluid flow in the passages of the valve body to operate the reverse clutch assembly in third gear whereby torque capacity of the transmission is increased.

A further object of one embodiment of the present invention is to provide a method of increasing torque in an automatic overdrive transmission, the transmission having a third gear and fourth gear clutch assembly, a reverse/forward clutch assembly and a torque converter with a turbine, the method comprising:

providing a valve body having a plurality of hydraulic valves for controlling up shift and downshift of transmission gears, the body having a network of fluid passages therein;

providing an automatic overdrive transmission having an inner input shaft and an outer input shaft coaxially arranged with the inner input shaft, the inner input shaft for partially operation of third gear and entire operation of fourth gear;

removing the inner input shaft and the outer input shaft;

coupling the single shaft to the turbine of the torque converter; and selectively blocking the fluid passages for redirecting hydraulic fluid flow in the passages of the valve body to operate the reverse clutch assembly in third gear whereby torque output of the transmission is increased.

A still further object of one embodiment of the present invention is to provide an automatic overdrive transmission having increased torque output, comprising;

an automatic overdrive transmission including a third gear and fourth gear clutch assembly, a reverse/forward clutch assembly, a torque converter with a turbine an inner input shaft and an outer input shaft, the inner input shaft for partially operation of third gear and entire operation of fourth gear;

the inner input shaft and the outer input shaft coupled to the turbine of the torque converter; and a valve body having a plurality of hydraulic valves for controlling up shift and downshift of transmission gears, the body having a network of fluid passages therein, at least some of the passages being blocked for redirecting hydraulic fluid flow in the passages of the valve body to operate the reverse clutch assembly in third gear whereby torque capacity of the transmission is increased.

Having thus described the invention, reference will now be made to the accompanying drawings illustrating preferred embodiments.

BRIEF DESCRIPTION OF THE DRAWINGS

Similar numerals employed in the text denote similar elements

DETAILED DESCRIPTION OF THE PREFERRED EMBODIMENTS

Figure 1:
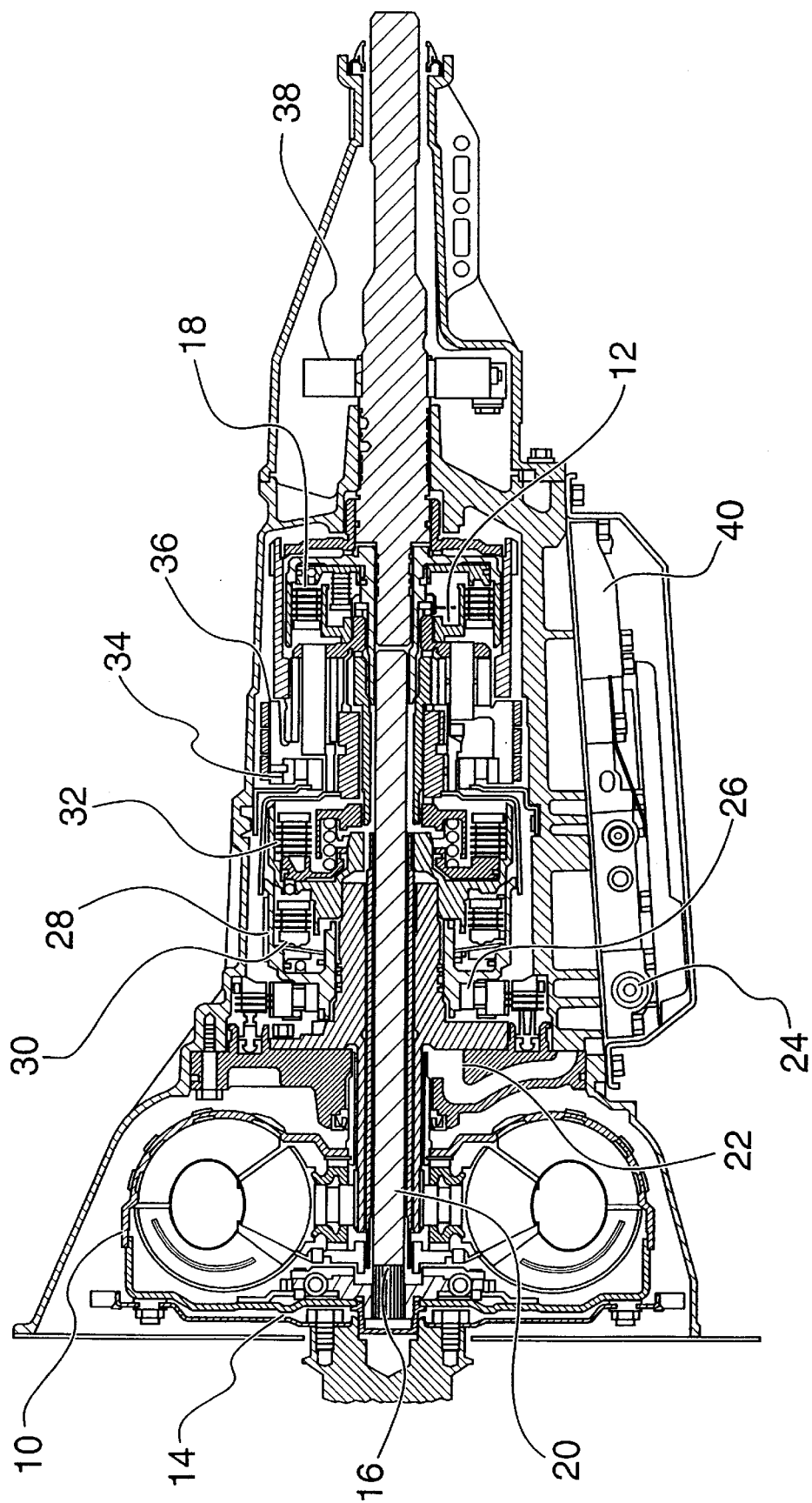
FIG. 1 is a cross-section of a typical automatic overdrive transmission.

Referring now to the drawings, FIG. 1 illustrates a cross-section of a conventional automatic overdrive transmission.

In general overview, numeral 10 represents the torque converter which couples the vehicle engine (not shown) to a planetary gear train 12. A damper assembly 14 is adjacent the torque converter 10. A direct drive shaft 16 (¾ input) couples the engine (not shown) to the direct clutch 18. An oil pump assembly 22 supplies oil to operate clutches, bands, torque converter, etc., and dissipate heat from the transmission. An outer input shaft 20 connects the turbine to forward drive and reverse clutch as is known in the art.

Turning to the various clutch assemblies, the intermediate clutch is denoted by numeral 24, intermediate one way clutch is represented by numeral 26 and the front overdrive band is referenced by numeral 28. The reverse clutch, forward clutch and planetary one way clutch are denoted by numerals 30,32 and 34, respectively. The remaining components include a low reverse band 36, direct clutch 18, compound planetary gear set 12, governor 38 and the control valve body 40.

Figure 2:
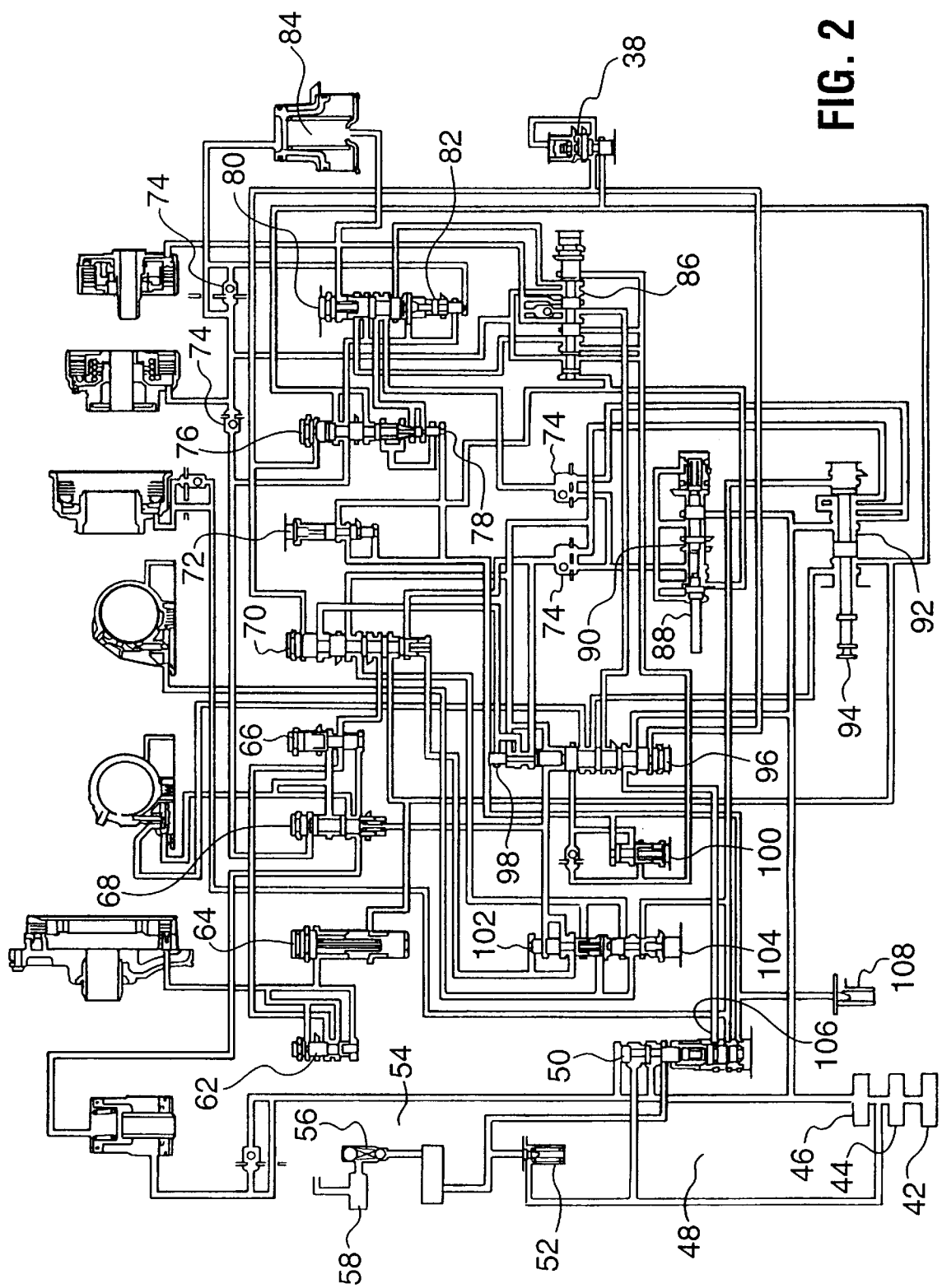
FIG. 2 is a plan view of one embodiment of the valve body of the present invention.

FIG. 2 illustrates the conventional hydraulic fluid circuit in schematic form. As is known, the circuit includes a sump 42 for supplying hydraulic fluid to the system, a protective screen 44, pump 46 and oil pressure booster valve 48 for adjusting pressure relative to throttle (not shown) opening. Main regulator valve 50 controls pressure in the system and converter relief valve 52 precludes excessive pressure from building in the torque converter 10 (FIG. 1). Additional elements in the system include converter 54, valve 56 and cooler 58 all of which function in a known manner.

Numeral 60 denotes the 3–4 accumulator which smooths 3–4 up shifting. The 1–2 capacity modulator valve 62 and 1–2 accumulator valve 64 cooperate to cushion 1–2 up shifting in the transmission. An overdrive servo regulator valve 66 applies pressure for 4–3 downshifting and 3–4 shuttle valve 68 controls valve 66.

The 1–2 shift valve 70 controls up and down shifting, while T.V. limit valve 72 controls the pressure experienced by valve 48. Numeral 74 denotes a check valve with the remaining common valves referenced commonly.

The 3–4 shift valve 76 operates automatic 3–4 up and 4–3 down shifting. A modulator valve 78 controls the pressure on valve 76. Orifice valve 80 precludes shifting from second gear into overdrive. Modulator valve 82 controls pressure on 2–3 accumulator valve 84. The 2–3 back out valve 86 controls the direct clutch 18 (FIG. 1). Throttle plunger 88 changes the spring force on throttle valve 90. Manual valve 92 moves with the shift selector 94 to provide automatic functions of the hydraulic system.

The 2–3 shift valve 96 controls up 2–3 and down 3–2 shifting and modulator valve 98 controls the pressure on valve 94. A 3–4 back out valve 100 buffers 3–4 up shifting if such shifting occurs in a closed throttle condition and 2–1 scheduling valve 102 regulates 2–1 down shifting speed upon selector 94 being moved from manual low from direct drive or overdrive. Modulator valve 106 and relief valve 108 complete the circuit.

Figure 3:
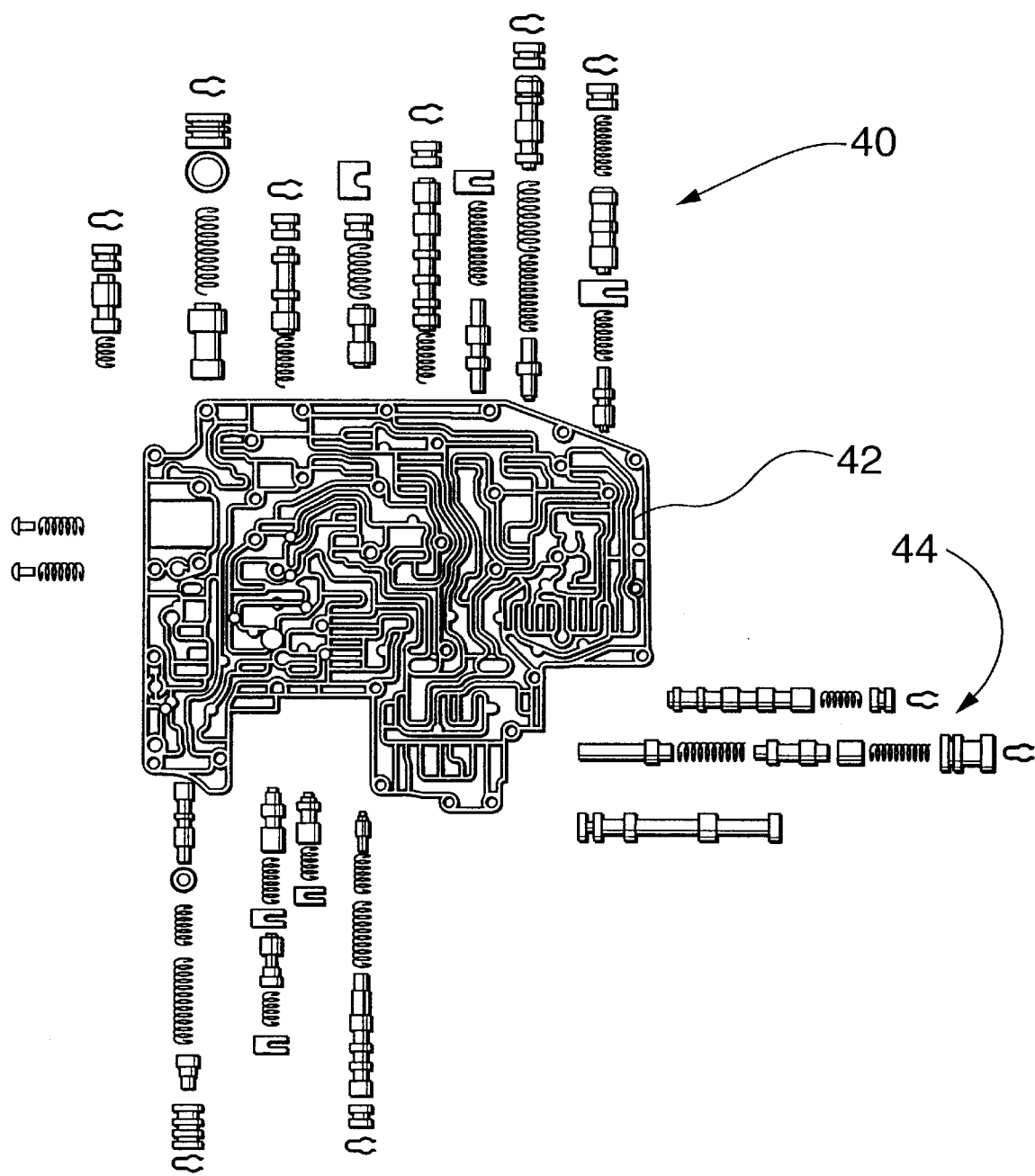
FIG. 3 is an exploded view of the conventional valve body employed in the transmission of FIG. 1.
Figure 4:
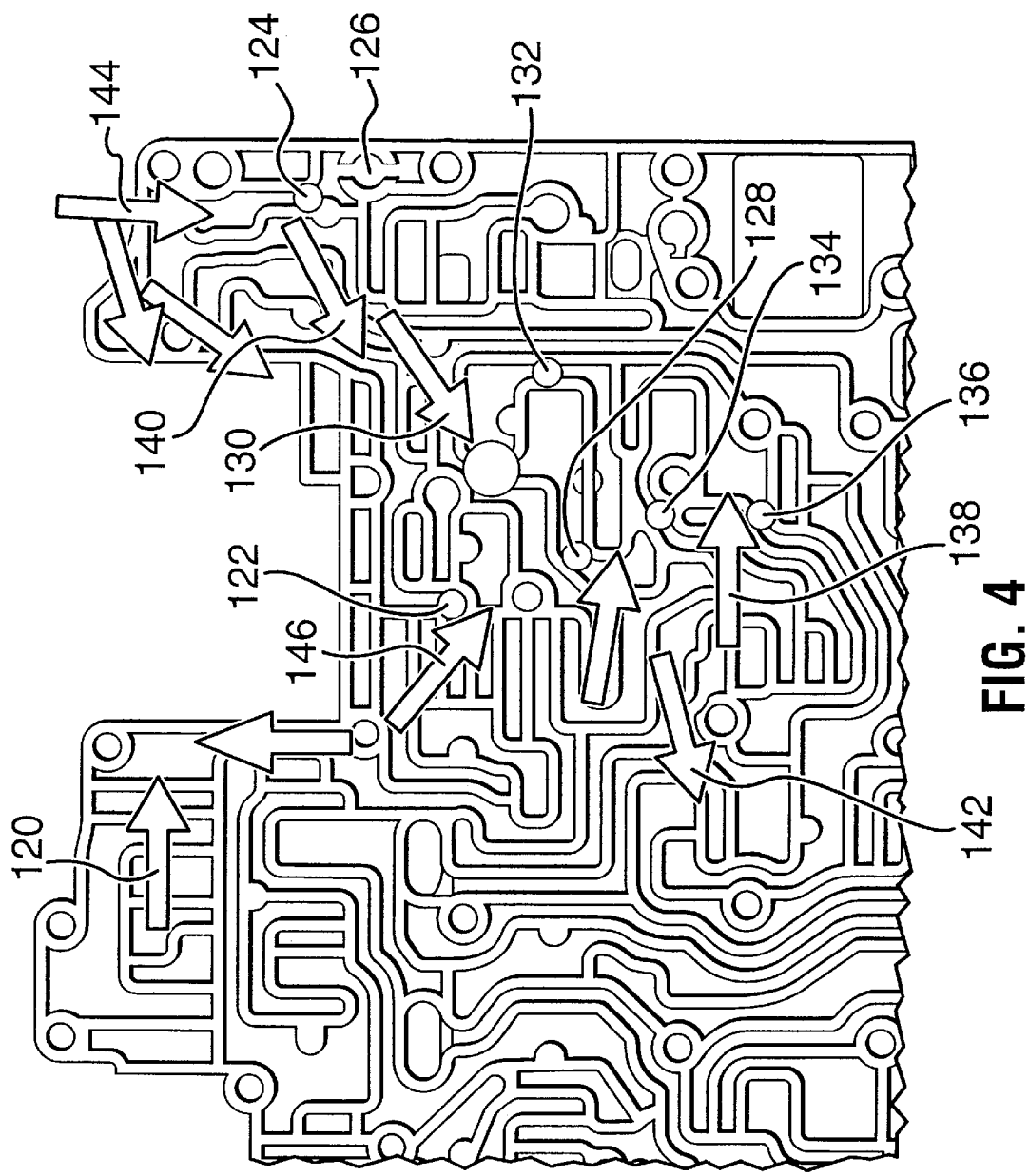
FIG. 4 is a top plan view of the hydraulic fluid circuit passages of the modified valve body according to one embodiment of the present invention.

FIG. 3 illustrates the conventional valve body 40 housing the hydraulic circuit in a top plan and exploded form. The body 40 comprises a network of fluid passages 42 and valve members, the latter having been discussed supra. As is evident, the valves all include typical springs, clips etc. which will not be discussed further. In contrast to the conventional body 40 in FIG. 3, FIG. 4 illustrates the modified valve body according to one embodiment of the present invention.

Reference to the numerals and circuits depicted in FIGS. 3 and 4 will be of use in the following description. In the embodiment, apertures are made in body 40 into the bore for manual valve 92 and blockage of passage 120 results in a delay of pressurization of valve 96 until the manual valve 92 is moved into the overdrive position (not shown) as selected with selector 94. A second blockage is made at location 122 in the body 40 to block redirected mainline pressure from escaping through the 2–3 shift valve 96. A blockage at location 124 eliminates the reverse boost.

Locations 126 and 128 are joined by a hollow tube (not shown) on the underside of the body 40 for redirection of reverse clutch fluid pressure from 126 to 128. A bridge 130 is employed to connect forward clutch fluid pressure to the low reverse servo modulator valve 104. A blockage at location 130 precludes forward clutch pressure from entering the valve 104. A blockage at location 134 prevents fluid from entering the 2–1 scheduling valve 102 and plug or blockage at location 136 prevents pressure escape into valve 102; aperture 138 exhausts cross leaked pressure.

Location 140 may be blocked to prevent redirected clutch pressure from entering valve 106. An aperture (not shown) is formed at location 142 to allow fluid to by pass the park/$1^{st}$/reverse circuit the 1–2 shift valve 70. A further aperture (not shown) at location 144 exhausts residual pressure from valve 106. Finally, an aperture (not shown) at location 146 by passes direct clutch pressure through blocked location 122 into the former 2–3 cut back circuit.

Figure 5A:
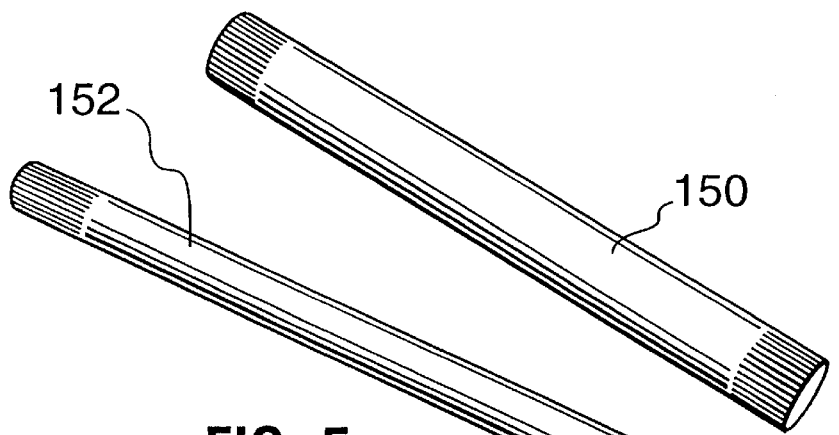
FIG. 5a is a perspective view of the standard input/out shaft associated with the automatic overdrive transmission.
Figure 5B:
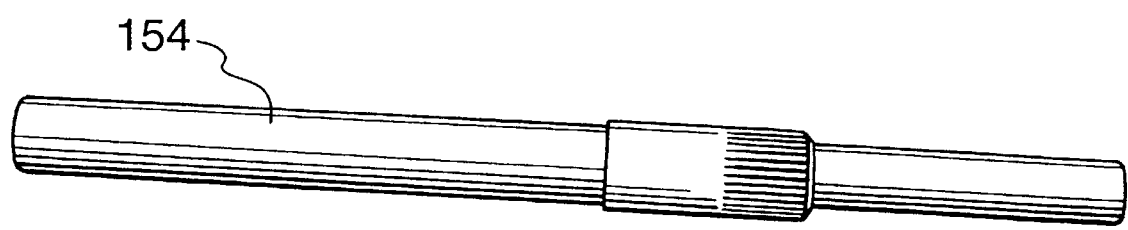
FIG. 5b is a perspective view of a one-piece shaft suitable for use in the present invention.

FIG. 5a illustrates the drive shaft typically provided in the automatic overdrive transmission. The shaft comprises an outer 150 and inner 152 which, when assembled, are in a coaxial relationship. FIG. 5b illustrates a single shaft 154 manufactured by G.E.R. of Pennsylvania.

As stated herein previously, when the stock or standard shaft arrangement 150, 152 is employed, the same may be coupled to the turbine of the torque converter; shaft 154 may alternatively be used by replacing shafts 150, 152.

It has been found that by making use of the present invention, a 58.5% increase in clutch area becomes available for third gear, thus significantly enhancing the torque capacity of the transmission.

Although embodiments of the invention have been described above, it is not limited thereto and it will be apparent to those skilled in the art that numerous modifications form part of the present invention insofar as they do not depart from the spirit, nature and scope of the claimed and described invention.

I claim:

1. An automatic overdrive transmission having increased torque capacity, comprising:

an automatic overdrive transmission including a third gear and fourth gear clutch assembly, a reverse/forward clutch assembly, a torque converter with a turbine an outer input shaft and an inner input shaft, said inner input shaft for partially operation of third gear and entire operation of fourth gear;

said inner input shaft and said outer input shaft coupled to said turbine of said torque converter; and a valve body having a plurality of hydraulic valves for controlling up shift and downshift of transmission gears, said body having a network of fluid passages therein, at least some of said passages being blocked for redirecting hydraulic fluid flow in said passages of said valve body to operate said reverse clutch assembly in third gear whereby torque capacity of said transmission is increased.

2. The automatic transmission as set forth in claim 1, in combination with a vehicle.

3. The automatic transmission as set forth in claim 1, wherein said inner input shaft and said outer input shaft coupled to said turbine of said torque converter comprise a single shaft.

4. The automatic transmission as set forth in claim 1, wherein said transmission comprises 58.5% greater clutch area relative a conventional automatic overdrive transmission.

5. The automatic transmission as set forth in claim 1, wherein said passages are blocked with metal material.

6. A method of increasing torque capacity in an automatic overdrive transmission, said transmission having a third gear and fourth gear clutch assembly, a reverse/forward clutch assembly and a torque converter with a turbine, said method comprising:

providing a valve body having a plurality of hydraulic valves for controlling up shift and downshift of transmission gears, said body having a network of fluid passages therein;

providing an automatic overdrive transmission having an inner input shaft and an outer input shaft coaxially arranged with said inner input shaft, said inner input shaft for partially operation of third gear and entire operation of fourth gear;

coupling said inner input shaft and said outer input shaft to said turbine of said torque converter; and selectively blocking said fluid passages for redirecting hydraulic fluid flow in said passages of said valve body to operate said reverse clutch assembly in third gear whereby torque capacity of said transmission is increased.

7. The method as set forth in claim 6, wherein said third and fourth clutch assembly and said reverse/forward clutch assembly are operated simultaneously.

8. The method as set forth in claim 6, wherein said transmission gears include a third and fourth gear planet gear carrier, a forward sun gear and a reverse sun gear, said method including the step of locking said third and fourth gear planet gear carrier to said forward sun gear and locking said reverse sun gear.

9. The method as set forth in claim 6, wherein said hydraulic fluid is redirected under increased pressure when said passages are blocked.

10. The method as set forth in claim 6, wherein said coupling said inner input shaft to said turbine of said torque converter includes replacement of said inner input shaft and said outer input shaft with a single shaft.

11. The method as set forth in claim 6, wherein said passages are blocked with a material impervious to hydraulic fluid.

12. The method as set forth in claim 11, wherein said material comprises metal.

13. The method as set forth in claim 11, wherein said material comprises an epoxy compound.

14. A method of increasing torque capacity in an automatic overdrive transmission, said transmission having a third gear and fourth gear clutch assembly, a reverse/forward clutch assembly and a torque converter with a turbine, said method comprising:

providing a valve body having a plurality of hydraulic valves for controlling up shift and downshift of transmission gears, said body having a network of fluid passages therein;

providing an automatic overdrive transmission having an inner input shaft and an outer input shaft coaxially arranged with said outer input shaft, said inner input shaft for partially operation of third gear and entire operation of fourth gear;

replacing said outer input shaft and said inner input shaft with a single shaft;

coupling said single shaft to said turbine of said torque converter; and selectively blocking said fluid passages for redirecting hydraulic fluid flow in said passages of said valve body to operate said reverse clutch assembly in third gear whereby torque capacity of said transmission is increased.

15. The method as set forth in claim 14, wherein said transmission gears include a third and fourth gear planet gear carrier, a forward sun gear and a reverse sun gear, said method including the step of locking said third and fourth gear planet gear carrier to said forward sun gear and locking said reverse sun gear.

16. The method as set forth in claim 14, wherein said third and fourth clutch assembly and said reverse/forward clutch assembly are operated simultaneously.

17. The method as set forth in claim 14, wherein said transmission gears include a third and fourth gear planet gear carrier, a forward sun gear and a reverse sun gear, said method including the step of locking said third and fourth gear planet gear carrier to said forward sun gear and locking said reverse sun gear.

18. The method as set forth in claim 14, wherein said transmission has a gear shift pattern of first gear, second gear and subsequently third gear.

* * * * *